Aug. 25, 1953
W. A. MAHER
2,650,130
WINDSHIELD VISOR WITH CENTER SUPPORTING BRACKET
Original Filed Aug. 14, 1947
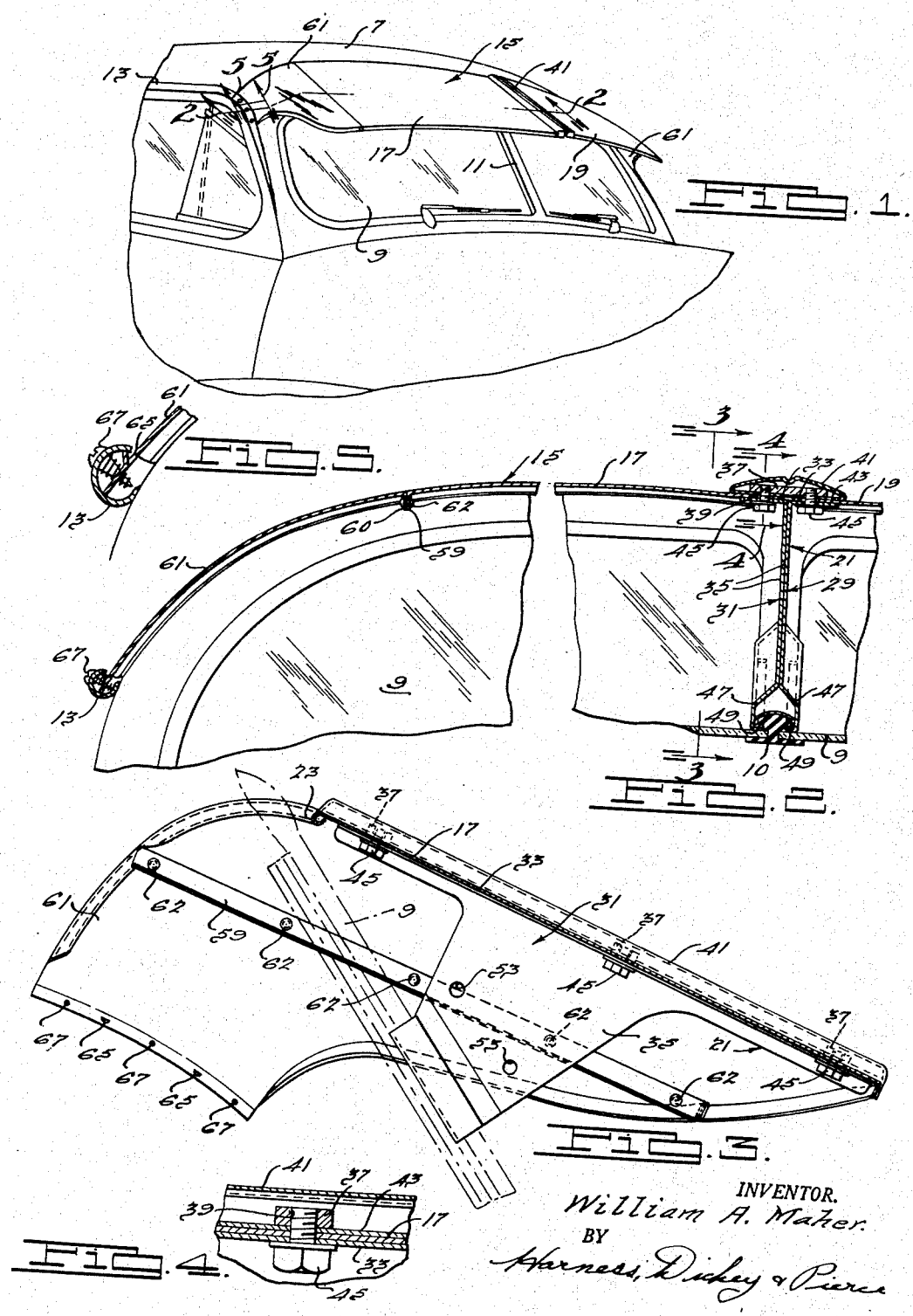
INVENTOR.
William A. Maher.
BY
Harness, Dickey & Pierce
ATTORNEYS.

Patented Aug. 25, 1953

UNITED STATES PATENT OFFICE 2,650,130

2,650,130
WINDSHIELD VISOR WITH CENTER SUPPORTING BRACKET

William A. Maher, Detroit, Mich.

Continuation of application Serial No. 768,688, August 14, 1947. This application February 3, 1950, Serial No. 142,221

5 Claims. (Cl. 296—95)

This invention relates to an improved sun visor for the windshield of a motor vehicle.

This is a continuation of my copending application Serial No. 768,688 which was filed August 14, 1947, and subsequently abandoned.

The principal objects of this invention are to provide a sun visor having a visor portion extending substantially across the windshield of an automotive vehicle and having end shoulders connected to the opposite end of visor portion and shaped to conform to the front portion of the top panel of the vehicle so as to make it more nearly appear that the visor is built into the body as an extension thereof rather than something that has been added as an afterthought; the provision of a construction as above described in which the shoulders are directly engageable with and are securable to the vehicle drip moldings on the opposite sides of the vehicle windshield; to provide an improved sun visor of the aforementioned type in which the end shoulders are formed separately from the visor portion so that the end shoulders may be plated or otherwise finished independently of the visor portion in a more efficient and inexpensive manner; to provide a sun visor of the aforementioned type in which the end shoulders are formed separately from the visor portion in order to permit the former to be made of a different material than the visor portion, this so that the visor portion may be made of a material such as plastic, aluminum, fiberboard, or any material not suitable for direct securement to the vehicle drip moldings, or from a material having a desirably different vibrating or other tendency from that from which the shoulders are made; to provide a sun visor of the aforementioned type in which the extreme ends of the end shoulder portions are provided with projections or tabs which are engageable in the vehicle drip moldings to aid in rigidly securing the same thereto; to provide improved bracket means for securing the center of the visor portion to the trim stick of the vehicle windshield, which bracket means is of a length substantially equal to the fore and aft width of the visor so as to give greater support thereto, freedom from deflection under high pressures, and will better hold the visor in its original shape; to provide a sun visor of the aforementioned type in which the visor portion is made of two visor body sections having their adjacent edges in a substantially abutting relation, and in which the aforementioned bracket means overlie the underside of the adjacent edges of the visor body sections so that common means may be employed for rigidly securing the visor body sections and said bracket means relative to each other to provide a sun visor of the aforementioned type which is especially attractive in appearance, rugged in construction, and easily connected to a vehicle.

These and other objects of this invention will become apparent from the following detailed description taken in conjunction with the accompanying drawings, in which:

Fig. 1 is a fragmentary perspective view of a vehicle with the sun visor of this invention mounted thereon;

Fig. 2 is an enlarged sectional view of the structure illustrated in Fig. 1 taken along the line 2—2 thereof;

Fig. 3 is a sectional view of the structure illustrated in Fig. 2 taken along the line 3—3 thereof;

Fig. 4 is an enlarged sectional view of the structure illustrated in Fig. 2 taken along the line 4—4 thereof; and Fig. 5 is an enlarged sectional view of the structure illustrated in Fig. 1 taken along the line 5—5 thereof.

Referring now to the drawings, it will be seen that a portion of conventional automobile vehicle is illustrated which has a conventional metal top 7 and a windshield 9 which is divided into two sections by means of a rubber molding 10 and windshield trim stick 11. Conventional drip moldings 13 are provided on opposite sides of the top 7 and extend arcuately downwardly at their forward ends so as to carry water away from over the doors.

The sun visor of this invention is generally indicated at 15 and is mounted on the front of the top 7 above the vehicle windshield 9 so as to extend across and angularly over a portion of the latter. In certain broader aspects of the invention the visor may be made of a single piece or of multiple pieces, but in accordance with a narrower phase of the invention it is made up of a plurality of parts and is so shown by way of illustration. Accordingly the sun visor 15 shown comprises a pair of like central body sections 17 and 19 which may be made of any suitable material such as metal, plastic, paperboard, or the like and which are assumed in the case shown to be made of sheet aluminum. Each of the body sections 17 and 19 has an inturned flange 21 along the front edge thereof and a reversely bent rolled flange 23 along the rear edge thereof for the purpose of added rigidity and appearance. The adjacent edges of the visor body sections 17 and 19 substantially abut each other.

Underlying the adjacent edges of the visor body sections 17 and 19 is a bracket generally indicated at 21, whose function is to support the central portion of the visor and to space its rear edge from the adjacent portion of the vehicle top. The bracket 21 comprises a pair of like sheet metal elements 29 and 31 which are of a length equal to the width of each of the body sections. Each of the bracket elements 29 and 31 is formed with a flange 33 which lies against the underside of each of the body sections 17 and 19 on opposite sides of the junction line thereof. The bracket elements 29 and 31 are also formed with leg portions 35 which substantially abut each other and are secured together in any suitable manner such as by welding or the like.

Overlying the outer faces of the adjacent body section edges are a plurality of spaced plate-like elements 37 which are provided with tapped apertures 39 adjacent each end thereof so as to form common nuts for securing the body sections and bracket with respect to each other which will now be brought out. Disposed over the common nuts 37 and extending perpendicular to the longitudinal axis of the body sections 17 and 19 is a trim stick 41 which has its opposite ends bent inwardly to provide inturned flanges 43 which abut against the outer faces of each of the body sections 17 and 19. The flanges 43 are clamped between the common nuts 37 and the body sections 17 and 19. Cap screws 45 are provided which extend through each of the bracket flanges 33 and the visor body sections 17 and 19 and are threadably received in the tapped apertures 39 in the common nuts 37 so as to secure the visor body sections, brackets, and the trim stick with respect to each other.

The bracket legs 35 extend arcuately rearwardly of the visor body sections 17 and 19 in a direction perpendicular thereto and have their rear ends separated to form clawlike portions 47. The extreme free end of each of the claw portions 47 is formed with an inturned flange 49. The flanges 49 are adapted to be inserted between the vehicle windshield 9 and the rubber molding 10 which is enclosed by the windshield trim stick 11. The bracket legs 35 adjacent the claw portions 47 are provided with aligned apertures 53 which are adapted to receive bolts or the like to compress and hold the claw portions against the windshield trim stick 11 and the flanges 49 embedded in the rubber between the windshield and molding. The bracket 21 therefore acts as a central support for the sun visor 15 when the same is mounted on the vehicle, as will be hereinafter described. It will thus be appreciated that the bracket 21 is of relatively rigid construction, it directly supports the visor at its center over the full fore and aft dimensions of the same, and has an extended length of contact with the trim stick 11, all of which enhances the strength and rigidity of the whole structure.

The opposite outer edges of each of the visor body sections 17 and 19 are formed with inturned flanges 59 which abut complemental flanges 60 formed on the inner edges of visor end portions or shoulders 61. The flanges 59 and 60 are connected by rivets 62 or other suitable means. Each of the visor end portions or shoulders 61, or at least the rear edge thereof, is formed to a transverse section conforming in shape to the front portion of the vehicle top 7, as well as forming extensions of the visor body sections 17 and 19. In conforming to the shape of the front portion of the body top, and in having its rear edge as well as its free end edges fitting such top when applied to a vehicle, it has the effect, when the visor is mounted on the body, of being an extension of the body itself rather than, as in other visor constructions heretofore suggested, of being something that has been added as an afterthought. Each of the shoulders 61 is therefore of an arcuate shape in transverse cross section and extends outwardly from the body sections 17 and 19 and the outer ends thereof are shaped to be received within each of the vehicle drip moldings 13 in parallel and closely spaced relation to the adjacent surface of the vehicle top. The remote or free end of each of the shoulders 61, as can be seen in Fig. 5, is provided with a pair of transversely spaced, lanced tabs or projections 65 which are adapted to be received in the drip moldings 13 to engage the inner periphery thereof and therefore aid in retaining and supporting the shoulders 61 within the drip moldings 13.

The extreme outer or free end of each of the shoulders 61 is secured in the corresponding drip molding 13 by means of metal screws 67 which are threaded through the drip molding and through the end of the shoulder, serving to fix such free end against the free edge of the drip molding with the tabs 65 retained under the inturned edge of the molding. The screws 67 and the tabs 65 thus rigidly retain the ends of the shoulders 61 in the drip moldings so that the entire sun visor is rigidly secured to the front of the vehicle with the rear edge between the shoulders thereof spaced upwardly of the top to allow air to flow therebetween and thereby prevent the building up of air resistance and pressure when the vehicle is moving.

The visor shoulders 61 are preferably made of steel, brass, or any suitable material which may be readily plated, such as with chromium, to produce a bright attractive finish therefor. The shoulders 61 are also preferably formed separately from the visor body sections 17 and 19 so that they can be finished independently thereof in a simple, efficient, and relatively inexpensive manner; that is, the shoulders 61 may be for example, chrome plated, while the body sections 17 and 19, for example, may be painted or enameled. In this way the sun visor may be easily assembled and the various parts made and finished in a relatively inexpensive manner. Due to the shape of the shoulders 61 and their separate finish, a more attractive sun visor is provided which may be easily attached to a vehicle, without the use of unattractive and expensive brackets or the like. The central bracket 21, due to the fact that its length is substantially equal to the width of the visor body sections 17 and 19, will give greater support to the sun visor, provide freedom from deflection under high wind pressure, and will hold the visor body sections so as to prevent them from losing their shape.

It will thus be seen that a simple, extremely attractive and very durable sun visor for vehicle windshields is provided which is especially neat in appearance.

Having thus described the invention, I claim:
1. A sun visor adapted to be connected over the windshield of a vehicle of the type having drip moldings on opposite sides of the top thereof, including a pair of visor body sections having coextensive inner end portions disposed adjacent to and contiguous with each other, bracket means having an edge portion underlying and extending entirely along the adjacent inner end portions of said visor body sections, means rigidly securing the adjacent edges of said visor body sections and said bracket means relative to each other, said bracket means having a web portion depending from and arranged substantially at right angles to said visor body sections and said web portion adapted to be connected to said vehicle to support the center of said sun visor, and visor end portions extending outwardly from the opposite outer ends of each of said visor body sections as continuations thereof and conforming along their rear edges to the shape of the front portion of the top of the vehicle, said end portions being of such lateral extent as to enable the outer free ends thereof to be directly securable to said drip moldings on the opposite sides of said windshield when applied to a vehicle body.

2. A sun visor adapted to be connected over the windshield of a vehicle of the type having drip moldings on opposite sides of the top thereof, including a pair of visor body sections having their adjacent edges in a substantially abutting relation, bracket means underlying each of said body section adjacent edges and being of a length substantially equal to the width of said visor body section, means securing said bracket means to each of said visor body sections whereby said body sections are rigidly secured with respect to each other, said bracket means including a depending web portion and the latter being connectible to the vehicle to support the center portion of said sun visor, and visor end portions extending outwardly from each end of each visor body section as continuations thereof and conforming along their rear edges to the shape of the front portion of the top of the vehicle, said end portions being of such lateral extent as to enable the outer free ends thereof to be directly securable to said drip moldings on each side of said windshield when applied to a vehicle body.

3. A sun visor adapted to be connected over the windshield of a vehicle of the type having drip moldings on opposite sides of the top thereof, including a pair of visor body sections having their adjacent edges in a substantially abutting relationship, bracket means underlying the adjacent edges of said body sections and being of a length substantially equal to the width of each of said body sections, common nut means overlying the top side of the adjacent edges of said visor body sections, screw means extending through said bracket means and each of said visor body sections and threadably received in said common nut means to secure said bracket means to said body sections and to secure said body sections with respect to each other, said bracket means provided with a depending web portion located approximately in alignment with the joint between said visor body section and said web being connectible to the vehicle to support the center thereof with respect thereto, and visor end portions extending outwardly from the opposite outer ends of each of said visor body sections as continuations thereof and conforming along their rear edges to the shape of the front portion of the top of the vehicle, said end portions being of such lateral extent as to enable the outer free ends thereof to be directly securable to the vehicle drip moldings on opposite sides of said windshield when applied to a vehicle body.

4. A sun visor adapted to be connected over the windshield of a vehicle of the type having drip moldings on opposite sides of the top thereof and having a trim stick dividing the windshield into two sections, including a pair of visor body sections having their adjacent edges in a substantially abutting relationship, a pair of like generally angle-sectioned sheet metal elements positioned at the joint of said visor body sections and having one leg of each in an abutting relationship and the other leg of each underlying the adjacent edge of one of said body sections, a plurality of common nuts overlapping the outer faces of said body sections, a trim stick disposed over said common nuts and having inturned flanges on the opposite ends thereof disposed between the opposite ends of said common nuts and the outer faces of said visor body sections, screw means extending through each of said overlying bracket legs and each of said visor body sections and threadably received in said common nuts so as to secure said bracket elements, visor body sections and visor trim stick with respect to each other, the remote ends of said abutting element legs being formed so as to be in spaced relation to each other and having inturned flanges which are adapted to be received between the windshield trim stick and the windshield proper so that the remote end of said bracket is connected to said vehicle, visor end portions extending outwardly from the opposite outer ends of said visor body sections as continuations thereof and conforming along their rear edges to the shape of the front portion of the top of the vehicle, said end portions being of such lateral extent as to enable their outer free ends to be directly securable to said vehicle drip moldings on opposite sides of said windshield when applied to a vehicle body.

5. A sun visor adapted to be connected over the windshield of a vehicle of the type having drip moldings on opposite sides of the top thereof and having a trim stick dividing the windshield into two sections, including a pair of visor body sections having their adjacent edges in a substantially abutting relationship, a pair of like generally angle-sectioned sheet-metal bracket elements positioned at the underside of the joint of said visor body sections and having one leg of each in an abutting relationship and the opposite leg of each underlying the adjacent edge of one of said body sections, a plurality of common nuts overlapping the outer faces of said body section adjacent edges, a trim stick disposed over said common nuts and having inturned flanges on the opposite ends thereof disposed between the opposite ends of said common nuts and the outer face of said visor body sections, screw means extending through each of said bracket legs and each of said visor body sections and threadably received in said common nuts so as to secure said bracket elements, visor body sections and trim stick with respect to each other, the remote ends of said abutting bracket element legs being formed so as to be in spaced relation to each other and having inturned flanges which are adapted to be received between the vehicle windshield trim stick and the windshield proper, means for securing said remote ends of said element together to rigidly secure the remote end of said bracket elements to said vehicle, and visor end portions connected to the opposite outer edges of each of said body sections and extending outwardly therefrom as continuations thereof, said end portions conforming along their rear edges to the shape of the front portion of the top of the vehicle, said end portions being of such lateral extent as to enable the outer free ends thereof to be directly securable to said drip molding on opposite sides of said windshield, and means formed on the outer ends of each of said visor end portions engageable in each of said vehicle drip moldings to aid in securing said end portions with respect thereto.

WILLIAM A. MAHER.

References Cited in the file of this patent
UNITED STATES PATENTS

| Number | Name | Date |
|---|---|---|
| 2,500,406 | Greenfield | Mar. 14, 1950 |